United States Patent
Qu et al.

(10) Patent No.: US 9,473,035 B2
(45) Date of Patent: Oct. 18, 2016

(54) POWER CONVERSION DEVICE

(71) Applicants: LITE-ON ELECTRONICS (GUANGZHOU) LIMITED, GUANGZHOU (CN); LITE-ON TECHNOLOGY CORP., Taipei (TW)

(72) Inventors: Peng Qu, Nanjing (CN); Jianhua Zhou, Nanjing (CN); Zhihong Ye, Nanjing (CN)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 14/489,710

(22) Filed: Sep. 18, 2014

(65) Prior Publication Data

US 2015/0288289 A1    Oct. 8, 2015

(30) Foreign Application Priority Data

Apr. 2, 2014 (CN) .......................... 2014 1 0131668

(51) Int. Cl.
H02M 3/335    (2006.01)

(52) U.S. Cl.
CPC ....... *H02M 3/33546* (2013.01); *Y02B 70/1433* (2013.01)

(58) Field of Classification Search
CPC ............. H02M 1/12; H02M 3/33569; H02M 3/3376; H02M 3/33507; H02M 7/5387; H02M 7/53871; H02M 7/537
USPC ....... 363/16, 17, 40, 56.02, 95, 98, 131, 132
See application file for complete search history.

(56) References Cited

U.S. PATENT DOCUMENTS

| | | | |
|---|---|---|---|
| 2003/0227280 A1* | 12/2003 | Vinciarelli ............ | H02M 1/088 323/265 |
| 2005/0017695 A1* | 1/2005 | Stanley ............... | H02M 1/4208 323/207 |
| 2005/0078491 A1* | 4/2005 | Song ................. | H02M 3/33507 363/17 |
| 2009/0034299 A1* | 2/2009 | Lev ................... | H02M 3/33592 363/17 |
| 2009/0097280 A1* | 4/2009 | Wu .................... | H02M 3/33592 363/17 |
| 2009/0244934 A1* | 10/2009 | Wang ................ | H02M 3/33592 363/21.06 |
| 2010/0142229 A1* | 6/2010 | Chen ................. | H02M 3/33592 363/21.02 |
| 2011/0103097 A1* | 5/2011 | Wang ................ | H02M 3/33592 363/17 |
| 2014/0334189 A1* | 11/2014 | Yan ................... | H02M 3/33584 363/17 |
| 2015/0103562 A1* | 4/2015 | Yeh .................... | H02M 3/3353 363/17 |
| 2015/0229225 A1* | 8/2015 | Jang ..................... | H02M 3/285 363/17 |

* cited by examiner

*Primary Examiner* — Adolf Berhane
(74) *Attorney, Agent, or Firm* — Rosenberg, Klein & Lee

(57) ABSTRACT

A power conversion device includes a full-bridge switch circuit, a converter circuit, and a control circuit. The full-bridge switch circuit is operable to convert a direct current input voltage to a converted voltage. The converter circuit converts the converted voltage into a direct current output voltage. The converter circuit includes a resonant inductor, a transformer, a first converter switch, a second converter switch, an output inductor, and an output capacitor. The direct current output voltage is provided across the output capacitor. The control circuit controls the full-bridge switch circuit, the first converter switch and the second converter switch based on the direct current output voltage and a reference voltage.

4 Claims, 4 Drawing Sheets

POWER CONVERSION DEVICE

CROSS-REFERENCE TO RELATED APPLICATION

This application claims priority of Chinese application no. 201410131668.X, filed on Apr. 2, 2014.

BACKGROUND OF THE INVENTION

1. Field of the Invention

The present invention relates to a power conversion device.

2. Description of the Related Art

In order to achieve zero voltage switching (ZVS) within a larger load range, a conventional power conversion device includes a resonant inductor, and further includes an additional resonant inductor. As power management becomes more important nowadays, including such conventional power conversion device in a power supply device may cause inconvenience in power management.

A conventional power conversion device has the following drawbacks:

1. High cost: The power conversion device requires additional resonant inductor, increasing component cost.

2. Lowering the transforming efficiency of the power conversion: The additional resonant inductor required by the conventional power conversion device to perform power conversion greatly reduces the transforming efficiency of the power conversion. Also, the conventional power conversion device includes a large resonant inductor that occupies more space, increases power conversion loss, and limits the choices of the turns ratio of a transformer in the conventional power conversion device.

3. The conventional power conversion device despite having an additional resonant inductor cannot achieve entire load range ZVS.

4. Since the conventional power conversion device requires an additional resonant inductor, performing testing and tuning is required on the additional resonant inductor for ensuring functionality of an assembly.

5. Since the conventional power conversion device requires an additional resonant inductor, a control circuit is required between the two resonant inductors in the design of the power conversion device, increasing complexity in the overall design of the conventional power conversion device. Also, in order for the conventional power conversion device to be able to provide electrical power to power supplies that meet different specifications, the design of the control circuit for power managing is complicated.

SUMMARY OF THE INVENTION

The object of the present invention is to provide a power conversion device that allows the power conversion device to require only one resonant inductor without needing an additional resonant inductor.

According to the present invention, there is provided a power conversion device that includes a full-bridge switch circuit, a converter circuit, and a control circuit.

The full-bridge switch circuit is disposed to receive a first control signal, a second control signal, a third control signal, a fourth control signal, and a direct current input voltage. The full-bridge switch circuit is operable to convert the direct current input voltage to a converted voltage having a waveform that approximates a square wave.

The converter circuit is electrically coupled with the full-bridge switch circuit for receiving the converted voltage and for converting the converted voltage into a direct current output voltage. The converter circuit includes:

a resonant inductor having a first terminal electrically coupled with the full-bridge switch circuit, and a second terminal;

a transformer having a primary winding and a secondary winding, the primary winding having a first terminal electrically coupled with the second terminal of the resonant inductor, and a second terminal electrically coupled with the full-bridge switch circuit, the secondary winding having a first terminal, a second terminal, and a center tap positioned between the first terminal and the second terminal of the secondary winding;

a first converter switch having a first terminal electrically coupled to the second terminal of the secondary winding, a second terminal, and a third terminal disposed to receive a fifth control signal that controls the first converter switch to switch between an on state and an off state;

a second converter switch having a first terminal electrically coupled to the first terminal of the secondary winding, a second terminal electrically coupled with the second terminal of the first converter switch, and a third terminal disposed to receive a sixth control signal that controls the second converter switch to switch between an on state and an off state; and an output inductor and an output capacitor that are electrically coupled in series, the output inductor and the output capacitor being electrically coupled with and disposed between the center tap of the secondary winding and the second terminal of the second converter switch, the direct current output voltage being provided across the output capacitor.

The control circuit is electrically coupled with the full-bridge switch circuit and the converter circuit and is disposed to receive the direct current output voltage and a reference voltage. The control circuit generates the first control signal, the second control signal, the third control signal, and the fourth control signal for controlling the full-bridge switch circuit based on the direct current output voltage and the reference voltage, and generates the fifth control signal and the sixth control signal for controlling the first converter switch and the second converter switch based on the direct current output voltage and the reference voltage.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
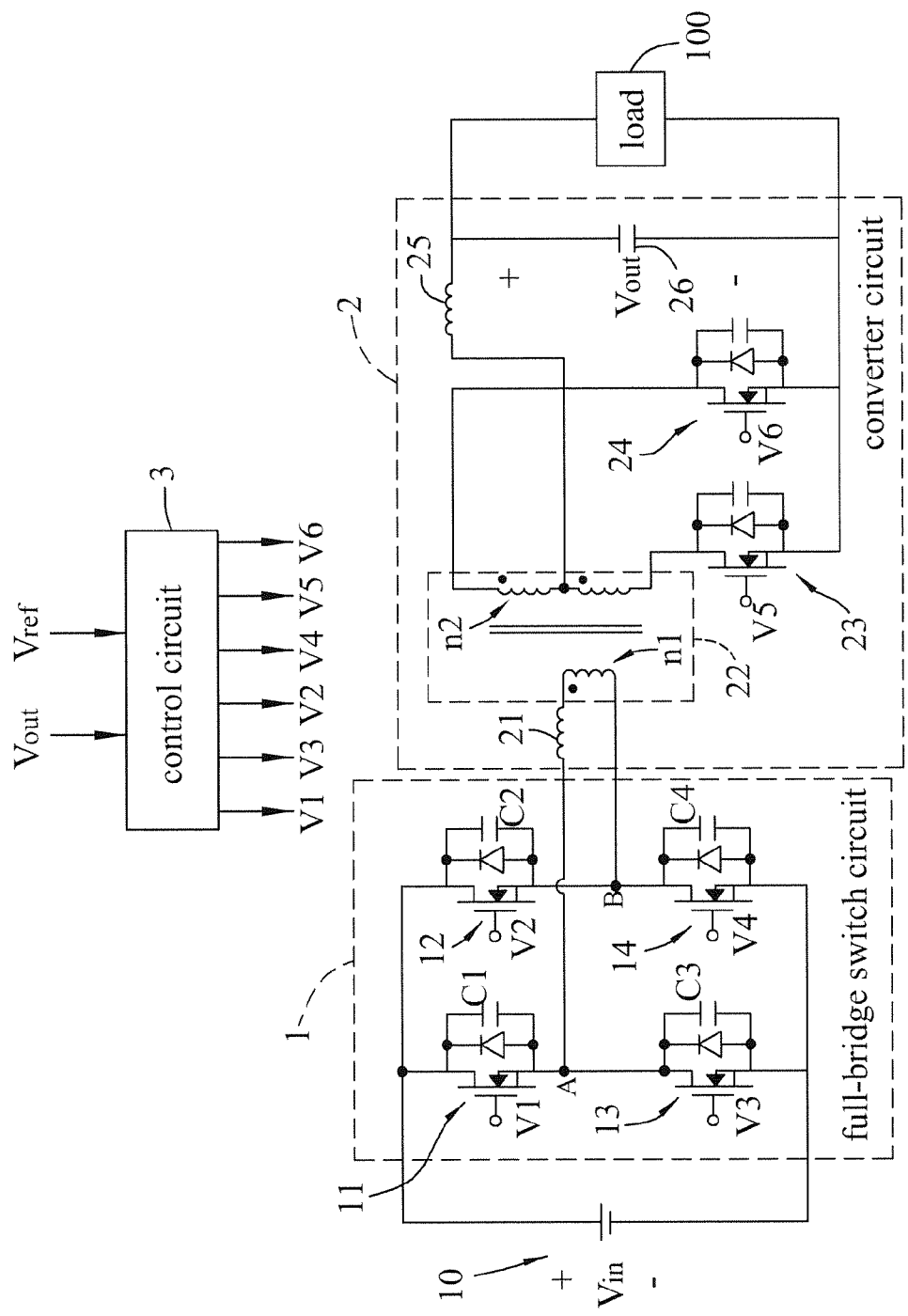
FIG. 1 is a circuit diagram of a power conversion device in a preferred embodiment of the present invention.
Figure 2:
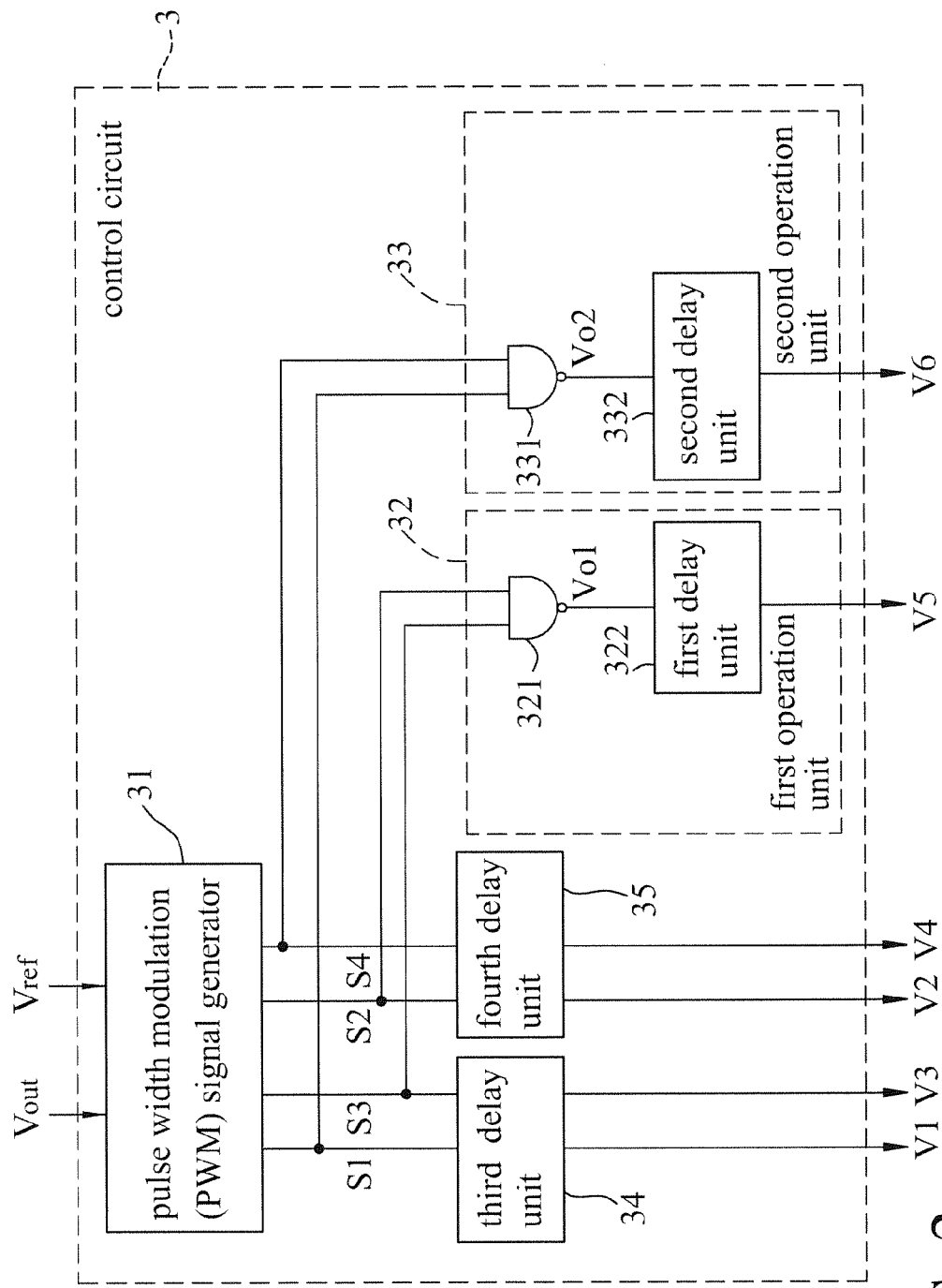
FIG. 2 is a circuit diagram of a control circuit of the power conversion device in the preferred embodiment of the present invention.

Referring to FIGS. 1 and 2, a power conversion device in a preferred embodiment of the present invention is adapted to be electrically coupled with a direct current power source 10 for receiving a direct current input voltage $V_{in}$ from the direct current power source 10 and for converting the direct current input voltage $V_{in}$ into a direct current output voltage $V_{out}$, which is provided to a load 100. The power conversion device includes a full-bridge switch circuit 1, a converter circuit 2 and a control circuit 3.

The full-bridge switch circuit 1 is electrically coupled with the direct current power source 10 for receiving the direct current input voltage $V_{in}$, and operates to convert the direct current input voltage $V_{in}$ to a converted voltage $V_{AB}$ having a waveform that approximates a square wave. The full-bridge switch circuit 1 includes a first switch 11, a second switch 12, a third switch 13, and a fourth switch 14.

The first switch 11 has a first terminal electrically coupled with a positive terminal of the direct current power source 10 for receiving the direct current input voltage $V_{in}$, a second terminal (node A in FIG. 1), and a third terminal for receiving a first control signal V1 that controls the first switch 11 to switch between an on state and an off state. The third switch 13 has a first terminal electrically coupled with the second terminal of the first switch 11, a second terminal electrically coupled with a negative terminal of the direct current power source 10, and a third terminal for receiving a third control signal V3 that controls the third switch 13 to switch between an on state and an off state. The second switch 12 has a first terminal electrically coupled with the first terminal of the first switch 11, a second terminal (node B in FIG. 1), and a third terminal for receiving a second control signal V2 that controls the second switch 12 to switch between an on state and an off state. The fourth switch 14 has a first terminal electrically coupled with the second terminal of the second switch 12, a second terminal electrically coupled with the second terminal of the third switch 13, and a third terminal for receiving a fourth control signal V4 that controls the fourth switch 14 to switch between an on state and an off state. In this embodiment, the voltage between the second terminals of the first switch 11 and the second switch 12 (the voltage between node A and node B) is referred to as the converted voltage $V_{AB}$.

The converter circuit 2 is electrically coupled with the full-bridge switch circuit 1 for receiving the converted voltage $V_{AB}$ and for converting the converted voltage $V_{AB}$ into a direct current output voltage $V_{out}$. The converter circuit 2 includes a resonant inductor 21, a transformer 22, a first converter switch 23, a second converter switch 24, an output inductor 25 and an output capacitor 26.

The resonant inductor 21 has a first terminal electrically coupled with the second terminal of the first switch 11 of the full-bridge switch circuit 1, and a second terminal. The transformer 22 has a primary winding $n_1$ and a secondary winding $n_2$. The primary winding $n_1$ has a first terminal electrically coupled with the second terminal of the resonant inductor 21, and a second terminal electrically coupled with the first terminal of the fourth switch 14. The secondary winding $n_2$ has a first terminal, a second terminal, and a center tap positioned between the first terminal and the second terminal of the secondary winding $n_2$. The first converter switch 23 has a first terminal electrically coupled to the second terminal of the secondary winding $n_2$, a second terminal, and a third terminal disposed to receive a fifth control signal V5 that controls the first converter switch 23 to switch between an on state and an off state. The second converter switch 24 has a first terminal electrically coupled to the first terminal of the secondary winding $n_2$, a second terminal electrically coupled with the second terminal of the first converter switch 23, and a third terminal disposed to receive a sixth control signal V6 that controls the second converter switch 24 to switch between an on state and an off state.

The output inductor 25 and the output capacitor 26 are electrically coupled in series. The output inductor 25 and the output capacitor 26 are electrically coupled with and disposed between the center tap of the secondary winding $n_2$ and the second terminal of the second converter switch 24. In this embodiment, a first terminal and a second terminal of the corresponding one of the primary winding $n_1$ and the secondary winding $n_2$ are dotted and non-dotted point, respectively, and the direct current output voltage $V_{out}$ being provided across the output capacitor 26.

The control circuit 3 is electrically coupled with the full-bridge switch circuit 1 and the converter circuit 2 and is disposed to receive the direct current output voltage $V_{out}$ and a reference voltage $V_{ref}$. The control circuit 3 generates the first control signal V1, the second control signal V2, the third control signal V3, and the fourth control signal V4 for controlling the full-bridge switch circuit 1 based on the direct current output voltage $V_{out}$ and the reference voltage $V_{ref}$, and generates the fifth control signal V5 and the sixth control signal V6 for controlling the first converter switch 23 and the second converter switch 24 based on the direct current output voltage $V_{out}$ and the reference voltage $V_{ref}$. As shown in FIG. 2, the control circuit 3 includes a pulse width modulation (PWM) signal generator 31, a first operation unit 32 including a first First NAND gate 321 and a first delay unit 322, a second operation unit 33 including a second Second NAND gate 331 and a second delay unit 332, a third delay unit 34 and a fourth delay unit 35.

The pulse width modulation (PWM) signal generator 31 is disposed to receive the direct current output voltage $V_{out}$ and the reference voltage $V_{ref}$ and is configured to generate a first PWM signal S1, a second PWM signal S2, a third PWM signal S3 and a fourth PWM signal S4 based on the direct current output voltage $V_{out}$ and the reference voltage $V_{ref}$. Each of the first control signal V1, the second control signal V2, the third control signal V3 and the fourth control signal V4 is related to a respective one of the first PWM signal S1, the second PWM signal S2, the third PWM signal S3 and the fourth PWM signal S4. The First NAND gate 321 is electrically coupled with the PWM signal generator 31 for receiving the second PWM signal S2 and the third PWM signal S3, and outputs a first output signal $V_{O1}$ based on the second PWM signal S2 and the third PWM signal S3. The first delay unit 322 is electrically coupled with the first NAND gate 321 for receiving the first output signal $V_{O1}$ and is configured to generate the fifth control signal V5 based on the first output signal $V_{O1}$.

The second NAND gate 331 is electrically coupled with the PWM signal generator 31 for receiving the first PWM signal S1 and the fourth PWM signal S4 and outputs a second output signal $V_{O2}$ based on the first PWM signal S1 and the fourth PWM signal S4. The second delay unit 332 is electrically coupled with the second NAND gate 331 for receiving the second output signal $V_{O2}$ and is configured to generate the sixth control signal V6 based on the second output signal $V_{O2}$. The third delay unit 34 is electrically coupled with the pulse width modulation (PWM) signal generator 31 for receiving the first PWM signal S1 and the third PWM signal S3, and is configured to generate the first control signal V1 and the third control signal V3 based on the first PWM signal S1 and the third PWM signal S3, respectively. The fourth delay unit 35 is electrically coupled with the pulse width modulation (PWM) signal generator 31 for receiving the second PWM signal S2 and the fourth PWM signal S4, and is configured to generate the second control signal V2 and the fourth control signal V4 based on the second PWM signal S2 and the fourth PWM signal S4, respectively.

Figure 3:
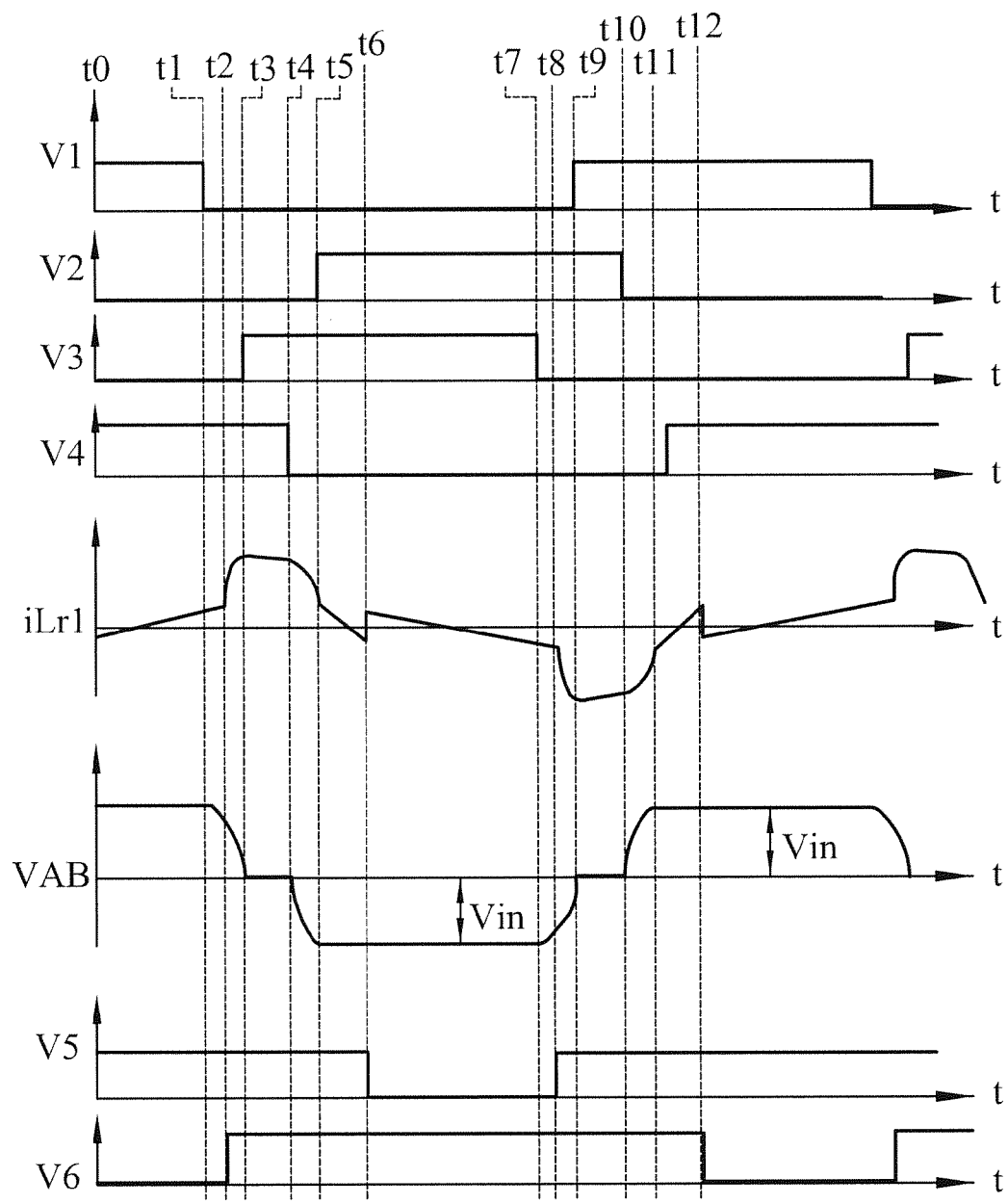
FIG. 3 is a timing diagram of the preferred embodiment when there is no current flowing through a load.

Referring to FIGS. 1 and 3, the power conversion device operates in twelve modes in which the current flowing through the load 100 is zero.

Mode One (t0-t1)

When the first switch 11, the fourth switch 14 and the first converter switch 23 are in the on-state, the resonant inductor 21 is being charged by the converted voltage $V_{AB}$, and a current iLr1 flowing through the resonant inductor 21 increases linearly.

Mode Two (t1-t2)

The first switch 11 is switched to an off-state, while the fourth switch 14 and the first converter switch 23 remain in the on-state. The parasitic capacitances C1, C3 of the first switch 11 and the third switch 13 start to resonate with the resonant inductor 21, and the current iLr1 flowing through the resonant inductor 21 is an electric excitation current. At time t2, since the voltage at the second terminal (voltage at node A) of the first switch 11 drops only by a small magnitude, the magnitude of the converted voltage $V_{AB}$ is approximately equal to the direct current input voltage $V_{in}$.

Mode Three (t2-t3):

The first switch 11 remains in the off-state, while the fourth switch 14 and the first converter switch 23 remain in the on-state, and the second converter switch 24 is switched to an on state. This causes the secondary winding $n_2$ of the transformer 22 to be shorted, causing the primary winding $n_1$ of the transformer 22 to be shorted as well. The resonant inductor 21 and the parasitic capacitances C1, C3 of the first switch 11 and the third switch 13 start resonating, in which the parasitic capacitance C3 releases energy to the resonant inductor 21. Since the time constant of resonance (i.e., $2\pi\sqrt{lr(c1+c3)}$, wherein lr is the inductance of the resonant inductor 21, and c1 and c3 are the parasitic capacitances C2, C3) is smaller, the current iLr1 increases rapidly. At time t3, the voltage at the second terminal of the first switch 11 is equal to zero, and the current iLr1 of the resonant inductor 21 is a peak current. At this moment, the third switch 13 is switched to an on-state for zero voltage switching (ZVS).

Mode Four (t3-t4):

The third switch 13 is switched to an on-state, the first switch 11 remains in the off-state, the fourth switch 14, the first converter switch 23 and the second converter switch 24 remain in the on-state, and the transformer 22 remains shorted, such that the current iLr1 remains approximately constant.

Mode Five (t4-t5):

The fourth switch 14 is switched to an off state, the first switch 11 remains in the off-state, while the third switch 13, the first converter switch 23 and the second converter switch 24 remain in the on-state. The resonant inductor 21 and the parasitic capacitances C2, C4 of the second switch 12 and the fourth switch 14 start resonating. The current iLr1 drops from the peak current to a small magnitude. When the voltage at the second terminal of the second switch 12 (i.e., the voltage at the node B) drops to the direct current input voltage $V_{in}$, the second switch 12 is switched to an on-state for ZVS.

Mode Six (t5-t6):

The second switch 12 is switched to an on-state, the first switch 11 and the fourth switch 14 remain in the off-state, the third switch 13, the first converter switch 23 and the second converter switch 24 remain in the on-state, and the transformer 22 remains shorted. In this mode, the first converter switch 23 and the second converter switch 24 are inverted, i.e., a current flowing through the first converter switch 23 is reduced, and a current flowing through the second converter switch 24 is increased.

Mode seven (t6-t7) to mode twelve (t11-t12) have working principles and operations similar to those of modes one to six, and the differences therebetween being that: the current iLr1 and the voltage $V_{AB}$ in mode seven (t6-t7) to mode twelve (t11-t12) are opposite in magnitude to the current iLr1 and the voltage $V_{AB}$ in the mode one (t1-t2) to mode six (t5-t6).

Figure 4:
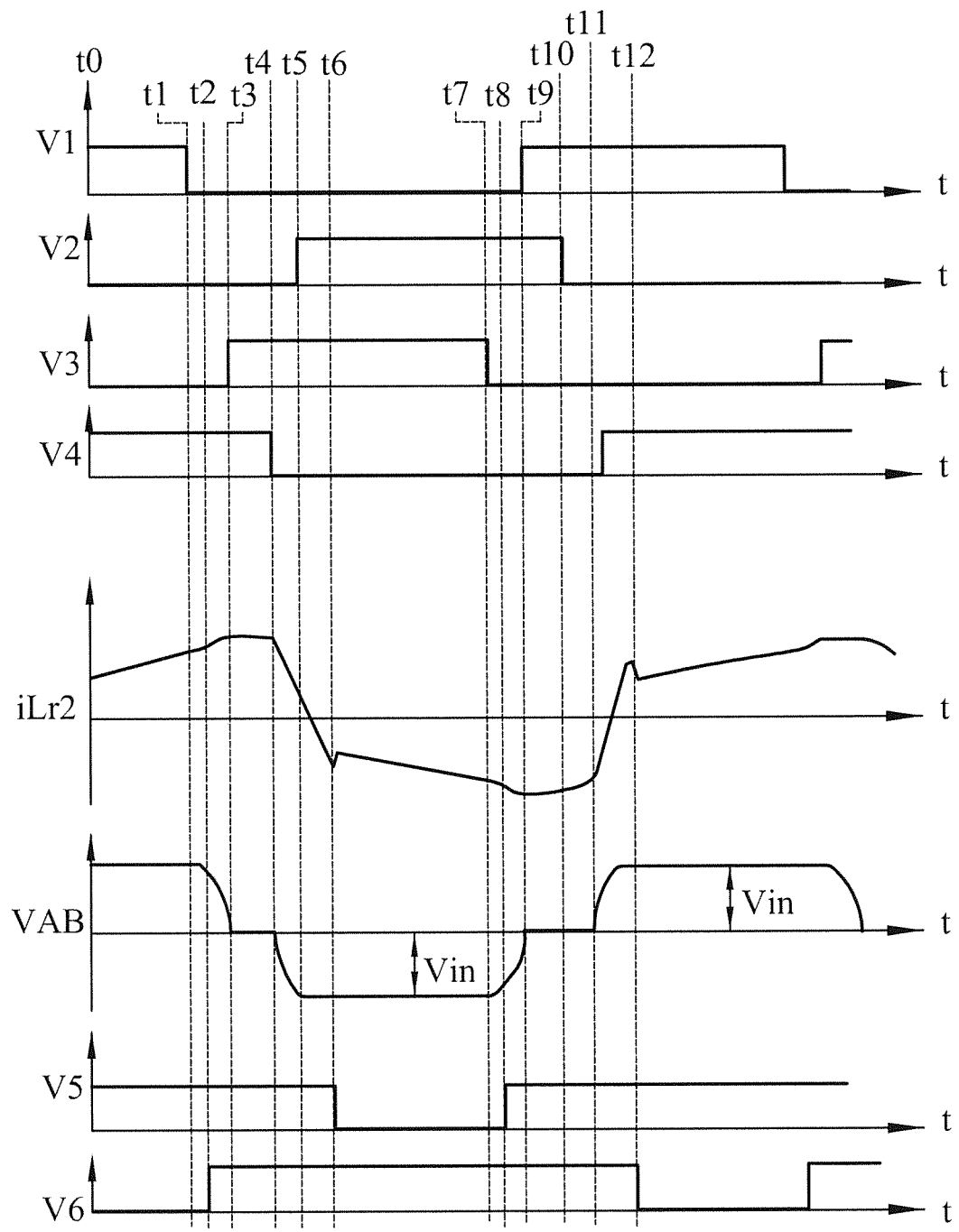
FIG. 4 is another timing diagram of the preferred embodiment when there is current flowing through the load.

Referring to FIG. 4, iLr2 represents the current flowing through the resonant inductor 21 when the current flowing through the load 100 is not equal to zero.

Referring to FIGS. 1 and 4, the operation of the power conversion device is discussed in twelve modes, while the current flowing through the load 100 is not equal to zero.

The twelve modes in FIG. 4 differ from the twelve modes in FIG. 3 in that: when the current flowing through the load 100 is not zero, energy of the resonant inductor 21 is from the current of the load 100 and the parasitic capacitance C3 of the third switch 13.

In summary, the preferred embodiment of the present invention possesses the following advantages:

1. Low cost: By switching the second converter switch 24 to an on-state, the power conversion device may achieve entire load range ZVS. This allows the power conversion device to only require one resonant inductor 21 without needing an additional resonant inductor, effectively lowering the component cost of the power conversion device.

2. Increasing the transforming efficiency of conversion power. By switching of the first converter switch 23 and the second converter switch 24, the transformer 22 can be shorted, enabling the power conversion device to achieve entire load range ZVS. Therefore, the power conversion device is able to perform power conversion using only one resonant inductor 21, and does not require an additional resonant inductor. This improves the transforming efficiency of power conversion since there is no additional resonant inductor consuming additional power. At the same time, the resonant inductor 21 included in the power conversion device has smaller dimensions and takes up less space, minimizing loss, and increasing the flexibility of selection of a turns ratio of the transformer 22.

3. Achieving entire load range zero voltage switching (ZVS): Prior to the magnitude of the converted voltage $V_{AB}$ reaching zero, the second converter switch 24 is switched to an on-state, causing the transformer 22 to be shorted, such that the parasitic capacitance C3 of the third switch 13 releases energy to the resonant inductor 21, and such that the power conversion device to have entire load range ZVS. Thus, the power conversion device in the present invention not only has simplified design and cost reduction of components, entire load range ZVS is achieved to improve transforming efficiency of power conversion.

4. Effectively simplifying manufacturing assembling procedure. Since the power conversion device in the present invention does not require an additional resonant inductor, performing testing and tuning is only required on the power conversion device itself for ensuring its functionality in an assembly. This effectively simplifies manufacturing and assembling procedure, lowering manufacturing cost and improving efficiency.

5. Effectively reducing circuit design complexity: Since the power conversion device in the present invention does not require an additional resonant inductor, an additional control circuit is not required in designing the power conversion device. Also, since an additional resonant inductor is not required, the power conversion device can be used for providing electrical power meeting different specifications, and the complexity in the circuit design of the power conversion device is effectively reduced. This lowers manufacturing cost and provides excellent power management.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power conversion device comprising:
  a full-bridge switch circuit disposed to receive a first control signal, a second control signal, a third control signal, a fourth control signal, and a direct current input voltage, the full-bridge switch circuit being operable to convert the direct current input voltage to a converted voltage $V_{AB}$ having a waveform that approximates a square wave, wherein each of the first, second, third, and fourth control signals electrically coupled with a parasitic capacitance, respectively;
  a converter circuit electrically coupled with the full-bridge switch circuit for receiving the converted voltage and for converting the converted voltage into a direct current output voltage, the converter circuit including:
    a resonant inductor having a first terminal electrically coupled with the full-bridge switch circuit and a second terminal;
    a transformer having a primary winding and a secondary winding, the primary winding having a first terminal electrically coupled with the second terminal of the resonant inductor, and a second terminal electrically coupled with the full-bridge switch circuit, the secondary winding having a first terminal, a second terminal, and a center tap positioned between the first terminal and the second terminal of the secondary winding;
    a first converter switch having a first terminal electrically coupled to the second terminal of the secondary winding, a second terminal, and a third terminal disposed to receive a fifth control signal that controls the first converter switch to switch between an on state and an off state;
    a second converter switch having a first terminal electrically coupled to the first terminal of the secondary winding, a second terminal electrically coupled with the second terminal of the first converter switch, and a third terminal disposed to receive a sixth control signal that controls the second converter switch to switch between an on state and an off state; and
    an output inductor electrically coupled in series between the center tap of the secondary winding, and distinct from it, and an output capacitor, the output capacitor being disposed between the output inductor and the second terminal of the second converter switch, the direct current output voltage being provided across the output capacitor; and
  a control circuit electrically coupled with the full-bridge switch circuit and the converter circuit and disposed to receive the direct current output voltage and a reference voltage, the control circuit generating the first control signal, the second control signal, the third control signal, the fourth control signal for controlling the full-bridge switch circuit based on the direct current output voltage and the reference voltage, and generating the fifth control signal and the sixth control signal for controlling the first converter switch and the second converter switch based on the direct current output voltage and the reference voltage;
  wherein, while the first converter switch is in an on state, the control circuit is configured to control the second converter switch to switch to an on state before magnitude of the converted voltage becomes zero.

2. A power conversion device comprising:
  a full-bridge switch circuit disposed to receive a first control signal, a second control signal, a third control signal, a fourth control signal, and a direct current input voltage, the full-bridge switch circuit being operable to convert the direct current input voltage to a converted voltage having a waveform that approximates a square wave;
  a converter circuit electrically coupled with the full-bridge switch circuit for receiving the converted voltage and for converting the converted voltage into a direct current output voltage, the converter circuit including:
    a resonant inductor having a first terminal electrically coupled with the full-bridge switch circuit and a second terminal;
    a transformer having a primary winding and a secondary winding, the primary winding having a first terminal electrically coupled with the second terminal of the resonant inductor, and a second terminal electrically coupled with the full-bridge switch circuit, the secondary winding having a first terminal, a second terminal, and a center tap positioned between the first terminal and the second terminal of the secondary winding;
    a first converter switch having a first terminal electrically coupled to the second terminal of the secondary winding, a second terminal, and a third terminal disposed to receive a fifth control signal that controls the first converter switch to switch between an on state and an off state;
    a second converter switch having a first terminal electrically coupled to the first terminal of the secondary winding, a second terminal electrically coupled with the second terminal of the first converter switch, and a third terminal disposed to receive a sixth control signal that controls the second converter switch to switch between an on state and an off state; and
    an output inductor electrically coupled in series between the center tap of the secondary winding, and distinct from it, and an output capacitor, the output capacitor being disposed between the output inductor and the second terminal of the second converter switch, the direct current output voltage being provided across the output capacitor; and
  a control circuit electrically coupled with the full-bridge switch circuit and the converter circuit and disposed to receive the direct current output voltage and a reference voltage, the control circuit generating the first control signal, the second control signal, the third control signal, the fourth control signal for controlling the full-bridge switch circuit based on the direct current output voltage and the reference voltage, and generating the fifth control signal and the sixth control signal for controlling the first converter switch and the second converter switch based on the direct current output voltage and the reference voltage;
    a pulse width modulation (PWM) signal generator disposed to receive the direct current output voltage and the reference voltage and configured to generate a first PWM signal, a second PWM signal, a third PWM signal and a fourth PWM signal based on the direct current output voltage and the reference voltage, each of the first control signal, the second control signal, the third control signal and the fourth control signal being related to a respective one of the first PWM signal, the second PWM signal, the third PWM signal and the fourth PWM signal;

a first operation unit electrically coupled with the PWM signal generator for receiving the second PWM signal and the third PWM signal, and configured to generate the fifth control signal based on the second PWM signal and the third PWM signal; and a second operation unit electrically coupled with the PWM signal generator for receiving the first PWM signal and the fourth PWM signal, and configured to generate the sixth control signal based on the first PWM signal and the fourth PWM signal.

3. The power conversion device as claimed in claim 2, wherein the first operation unit includes:

a First NAND gate that is electrically coupled with the PWM signal generator for receiving the second PWM signal and the third PWM signal and that outputs a first output signal based on the second PWM signal and the third PWM signal; and a delay unit electrically coupled with the First NAND gate for receiving the first output signal and configured to generate the fifth control signal based on the first output signal.

4. The power conversion device as claimed in claim 2, wherein the second operation unit includes:

a Second NAND gate that is electrically coupled with the PWM signal generator for receiving the first PWM signal and the fourth PWM signal and that outputs a second output signal based on the first PWM signal and the fourth PWM signal; and a delay unit electrically coupled with the Second NAND gate for receiving the second output signal and configured to generate the sixth control signal based on the second output signal.

* * * * *